CATHODE RAY TUBE SYSTEMS
Filed March 29, 1956
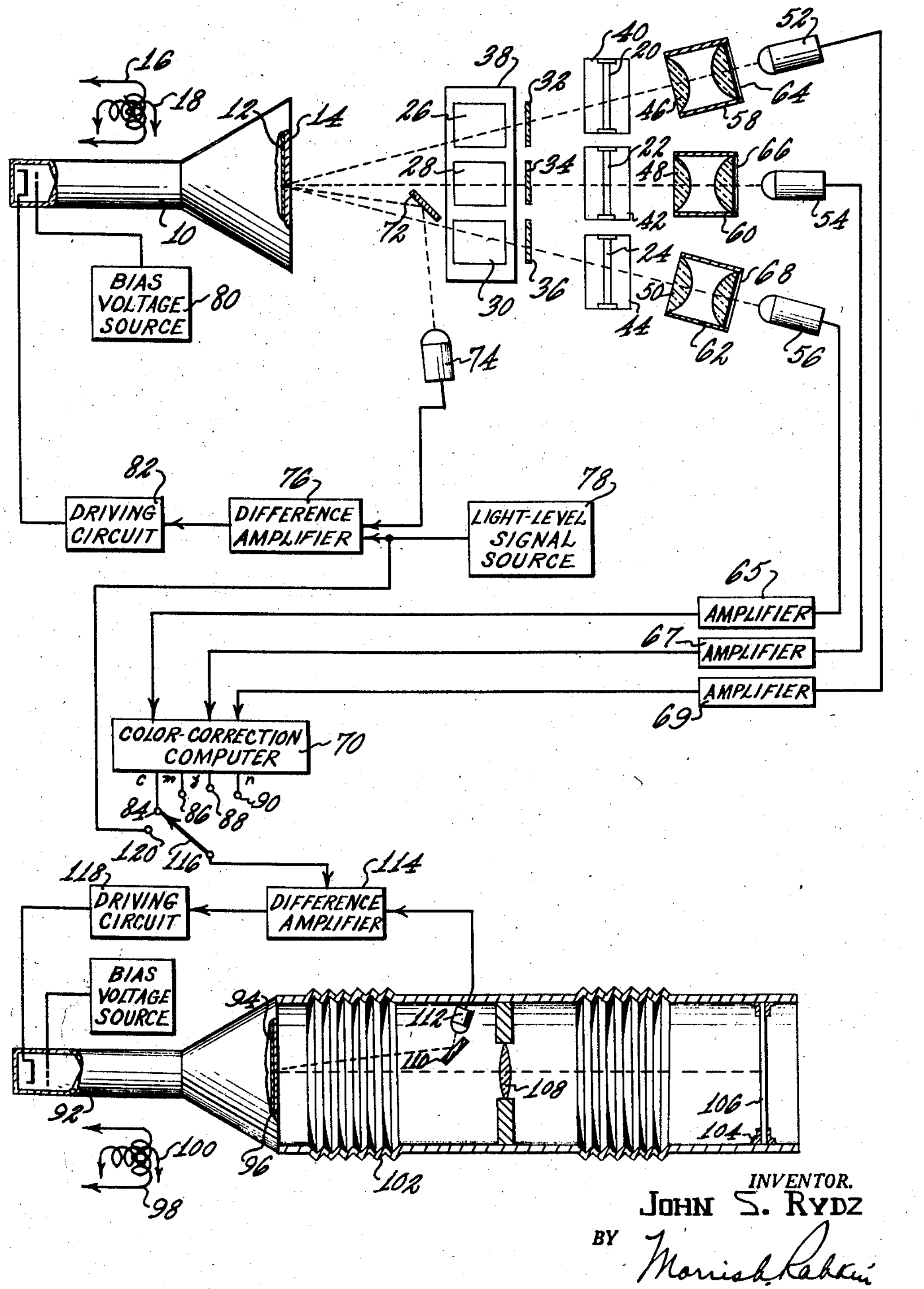
INVENTOR.
JOHN S. RYDZ
BY Morris L. Rabkin
ATTORNEY United States Patent Office 2,885,463

Patented May 5, 1959

2,885,463

CATHODE RAY TUBE SYSTEMS

John S. Rydz, Haddonfield, N.J., assignor to Radio Corporation of America, a corporation of Delaware Application March 29, 1956, Serial No. 574,686

16 Claims. (Cl. 178—5.2)

This invention relates to cathode ray tube systems, and particularly to such systems used for scanning and image reproducing.

This invention may be used in an electronic color correction system, for example, of the type described in an article entitled "Photographic and Photomechanical Aspects of Color Correction," by J. S. Rydz et al. in "The Sixth Annual Proceedings of the Technical Association of the Graphic Arts," 1954, at page 139. In such a system, a cathode ray tube is used as a flying spot scanner for scanning three photographic color separations of a subject to be reproduced. By means of the scanner and separate phototubes, electrical signals proportional to the color-component characteristics of corresponding picture elements or areas of the color separations are derived. These signals are applied to a computer, which produces corrected signals representative of ink percentages to be printed. The corrected signals are used to vary the light intensity of another image-reproducing cathode ray tube and to expose a set of corrected color separations, a set of printing plates are made, which plates are employed to reproduce the original subject.

Under ideal conditions, the intensity of the scanning light spot at the faceplate of the cathode ray tube should be uniform as the spot traces out a raster. Likewise the properties and placement of optical components should be such that there are no variations in the attenuation of the light intensity by such components over this raster. In other words, if the separations to be scanned are out of the optical channels, the light received by the phototubes should be uniform over the entire raster. It has been found that the scanning light spot and the attenuation of the optical components are generally not uniform over the raster; that is they vary as a function of the geometry of the system, Consequently, the color-component signals derived from the scanning operation and supplied to the computer contain false information, which results in errors in the corrected separations and in the final printed copy.

It is among the objects of this invention to provide:

A new and improved cathode ray tube and optical system in which light non-uniformities over the raster of the tube are compensated.

A new and improved system for compensating light nonuniformities in a cathode ray tube and optical system.

A new and improved system for compensating differential light effects in a cathode ray tube and optical system, which differential effects are a function of the geometry of the system and vary over the raster of the tube.

In accordance with this invention, a separate photosensitive sheet (for example, a glass plate or a film) is positioned in each optical channel of the optical system to be exposed by a light spot from the scanning cathode ray tube as it traces out its raster. The color separations are out of the optical system during this exposing operation. The photosensitive films are positioned to receive the scanning light after that light has passed all of the optical elements of the system that tend to produce non-linear effects over the raster of the light spot. Such a photosensitive film, when developed, forms a compensating film that contains the inverse of the non-linear effects of the corresponding optical channel of the system. By means of these compensating films, the inverse nonlinear effects are supplied during the scanning of the color separations. Thereby, the non-linear effects of the optical system are substantially cancelled, and the light falling on the phototubes varies as a substantially linear function of the color separations that are scanned. In accordance with another feature of this invention, a compensating plate is made for the optical channel of a camera. This camera plate may be used in the camera to cancel the non-linearities of the camera, or it may be used in subsequent photographic processing to cancel the camera non-linearities that are recorded.

The foregoing and other objects, the advantages and novel features of this invention, as well as the invention itself both as to its organization and mode of operation, may be best understood from the following description when read in connection with the accompanying drawing, in which like reference numerals refer to like parts, and which is a schematic optical and electrical diagram of a cathode ray tube system embodying this invention used in a color correction system.

A cathode ray tube 10 is used as a flying spot kinescope to provide a scanning light spot. The light spot is formed on a phosphor screen 12 deposited on the inside surface of the kinescope faceplate 14. Vertical and horizontal deflection coils 16 and 18, respectively, are provided to produce vertical and horizontal deflections of the light spot, thereby, forming a raster on the screen 12 of the tube 10. Appropriate deflection circuits (not shown) are connected to the deflection coils 16, 18. A beam focusing system (not shown) is also provided.

A light tight housing (not shown) encloses the optical system that is now described. The scanning light spot formed at the phosphor screen 12 is directed to corresponding areas of three uncorrected separation transparencies 20, 22, 24. These transparencies 20, 22, 24 may be separation positives of a colored subject, which positives are prepared from negatives that are exposed, for example, through red, green, and blue filters, respectively. The optical paths from the object plane of the kinescope faceplate 14 to the transparencies 20, 22, 24 are by way of separate imaging lenses 26, 28, 30 and separate corrector plates 32, 34, 36, respectively. The imaging lenses 26, 28, 30 may be substantially identical and of the symmetrical type. Where operated under a condition of unit magnification, a symmetrical lens has a minimum distortion. Symmetrical lenses having flat fields are used, in order that these lenses may be positioned in parallel planes, and the color separations may also be positioned in parallel planes. The lenses 26, 28, 30 are adjustably mounted in the frame 38 by appropriate means (not shown) for adjustment along the respective optical paths. The aperture stops (not shown) of the lenses 26, 28, 30 may be adjusted to vary the intensity of the imaged light spot. The corrector plates 32, 34, 36 compensate on the image sides of the lenses 26, 28, 30 for the optical effects of the kinescope faceplate 14 on the object sides.

The color separations 20, 22, 24 are mounted in supporting frames 40, 42, 44, respectively. Separate three-point register mechanisms (not shown) are used in the frames 40, 42, 44 to position the separations in planes parallel to the principal plane of the associated lenses 26, 28, 30, respectively. Additional means (not shown) may be provided in each frame 40, 42, 44 for adjusting the separations transversely of the optical paths, and for rotating each separation around the central axis of the associated path.

The light passing through the color separations 20, 22, 24 is collected by separate condenser lenses 46, 48, 50 and directed to separate phototubes 52, 54, 56, respectively. The condenser lenses 46, 48, 50 may each be formed of two plano-convex lenses supported with the convex surfaces adjacent in appropriate lens mountings 58, 60, 62, respectively. Also supported in these lens mountings 58, 60, 62, between the associated condenser lenses 46, 48, 50 and phototubes 52, 54, 56, are separate photographic films 64, 66, 68, respectively. The output signals of the phototubes 52, 54, 56 are representative of the light passing through the associated transparencies 20, 22, 24. These phototube signals, which are uncorrected color-component signals, are applied through separate amplifiers 65, 67, 69 having individual gain adjustments to the inputs of a color correction computer 70. Generally, the optical centers of these described optical elements and the central vertical line of the kinescope faceplate 14 lie in the same vertical plane (the drawing shows the positional relationship of the elements as seen from a side view).

A mirror 72 is positioned between the kinescope faceplate 14 and the imaging lenses 26, 28, 30 and outside of the optical paths to those lenses. This mirror 72 reflects the light spot formed on the kinescope faceplate 14 to a phototube 74. The output of the phototube 74 is supplied to one input of a difference amplifier 76. A signal source 78 supplies a signal of constant amplitude to the other input of the difference amplifier 76. The source 78 includes means for adjusting the signal amplitude to be proportional to the desired intensity of the scanning light spot. The difference amplifier 76 produces an error signal output which is proportional to the difference between the light intensity measured by the phototube 74 and the light intensity called for by the signal from the source 78. The grid of the kinescope receives a constant bias voltage from an appropriate source 80. The error signal from the difference amplifier 76 is applied to a driving circuit 82, such as a cathode follower, to vary the driving voltage applied to the cathode of the kinescope 10. A feedback loop is completed through the kinescope 10. By means of this feedback loop, a variation in cathode drive voltage produced by the error signal changes the intensity of the scanning light spot as measured by the phototube 74 to a value substantially equal to that called for by the signal source 78.

An appropriate form of color-correction computer that may be employed is described in U.S. Patent No. 2,434,561. The computer 70 generates color corrected signals in the form of voltages whose amplitudes vary in accordance with the uncorrected color-component signals received from the phototubes 52, 54, 56. Four computer output terminals 84, 86, 88, 90 are shown in the drawing, which terminals may correspond to the four printing inks cyan, magenta, yellow, and black. These inks are those customarily used in four-color printed reproductions. The corrected ink signals *c, m, y*, and *n* produced simultaneously at the output terminals relate to corresponding areas of the three uncorrected separations 20, 22, 24. The amplitudes of these signals correspond to the amounts of the respective printing inks that should be printed to reproduce the original subject. Each of the ink signals is a function of all of the uncorrected signals. In a color correction system, the computer ink signals *c, m, y, n* may be used to expose corrected color separations with the density of the corrected separations proportional to the computer output signals. From such corrected separations, printing plates may be subsequently made, for example, by photo-engraving processes.

The exposure of such corrected color separations may be by means of an image-reproducing kinescope 92. This kinescope 92 is generally similar to the scanning kinescope 10, and has a phosphor screen 94 on the inside surface of a faceplate 96, vertical and horizontal deflection coils 98, 100, and a focusing system (not shown) similar to that described above. The kinescope 92 operates as a light source for a camera. The camera includes a bellows 102, which is attached at one end to the kinescope faceplate 96, and which bellows 102 has a mounting 104 for a photosensitive plate 106 at the other end. A camera lens 108, appropriately supported within the bellows 102, is selected so that the angle of coverage of the lens 108 produces no distortion of the image of the kinescope faceplate 96 at the photosensitive plate 106. Appropriate means (not shown) may be provided for adjusting the magnification of the camera and for adjusting the focus.

A mirror 110 is positioned between the kinescope faceplate 96 and the camera lens 108 and outside of the light path to that lens 108. This mirror 110 reflects the light spot from the kinescope faceplate 96 onto a phototube 112. The output of the phototube 112 is applied to one input of a difference amplifier 114. The other input of the difference amplifier 114 is connected to a selector switch 116 which may be connected to one of the four output terminals 84, 86, 88, 90 of the color correction computer 70 or, for test purposes, to the constant signal source 78 by way of the switch terminal 120. The difference amplifier 114 produces an error signal output that is proportional to the difference between the intensity of exposure light measured by the phototube 112 and the intensity of light called for by the computer output signal. This error signal is applied to a driving circuit 118 to vary the voltage applied to the cathode of the kinescope 92. Thereby, a feedback loop is provided, by means of which the intensity of the exposing light spot is varied to conform to the light intensity called for by the computer output.

The camera system operates to expose the photosensitive plate 106 to a light spot whose intensity varies in accordance with the color corrected signals from the computer 70. The image-reproducing tube light spot is deflected synchronously with the scanning tube light spot. Thus, at any instant the light spot of the camera tube 92 is deflected to the same position as the light spot in the scanning tube 10. The exposed area of the photosensitive plate 106 at any instant corresponds picture-wise to the areas of the uncorrected separations 20, 22, 24 being scanned by the scanning tube 10, and for which the computer 70 is computing corrected signals. The amount of exposure of the photosensitive plate 106 is such as to produce a color-corrected separation of the original image. This operation is repeated four times with the selector switch 116 connected each time to a different one of the computer outputs 84, 86, 88, 90. In this way, a set of corrected separations is produced, which separations may be used to produce a set of printing plates for a four-color reproduction.

The photographic films 64, 66, 68 may be produced in the following manner: Unexposed photographic sheets (for example, glass plates or films) are positioned in the lens mountings 58, 60, and 62. The positions of these unexposed films are behind the respective condenser lenses 46, 48, 50 in the positions occupied by the films 64, 66, 68. The separations 20, 22, 24 are removed from the scanner during the exposure of the films. The phototube outputs may be disconnected from the computer 70. The kinescope 10 is then operated to trace out a complete raster. These photographic films in the mountings 58, 60, 62 are exposed by the light spot from the kinescope 10. The light intensity of this scanning spot is adjusted to be such that the photographic films are exposed above the toe of the photographic curve, for example, to provide a minimum density in these films of approximately 0.50. These films are then uniformly developed to a gamma of one. In this way the exposure of the photographic films is along the linear portions of the photographic curves. This insures substantially linear relationships of the light intensities that are recorded on the photographic films.

These developed films may then be replaced in the mountings 58, 60, 62 as the photographic plates 64, 66, 68.

The films 64, 66, 68, produced in this manner, provide records of the variations in light intensity for the three optical channels over the raster of the tube. These variations in light intensity over the raster of the light spot that is imaged at the photographic films 64, 66, 68, it has been found, have a number of causes. One of the causes, is that illumination received from a source or an aperture decreases due to the illuminated area being off the axis of illumination, the axis being normal to the plane of the illuminating source or aperture. This illumination variation is proportional to the fourth power of cos $\theta$, sometimes referred to as the "cosine-fourth" effect, in which the angle $\theta$ is the angle that the line to the illuminated area makes with the axis of illumination. The larger the angle $\theta$ to the illuminated area, the lower is the light level at that area. This cosine-fourth effect that results from off-axis illumination is discussed in the literature, for example, in the book "Fundamentals of Optics," Jenkins and White, 2nd edition, 1950, at page 110.

There are a number of different cosine-fourth effects in the optical system for the scanning kinescope 10. There are cosine-fourth effects in the illumination of the aperture stops of the lenses 26, 28, 30 from the phosphor screen 12; and there are cosine-fourth effects in the illumination of the separations 20, 22, 24 from the aperture stops of the lenses 26, 28, 30, respectively. There is a cosine-fourth variation in the illumination of the lens 28 of the green channel, assuming that it is positioned along the central illumination axis, for each horizontal trace of the scanning light spot. This illumination of the green channel lens 28 varies from a minium to a maximum and back to a minimum value as the light spot is deflected from one end of the raster to the other along a horizontal trace. These maximum and minimum values vary from horizontal trace to horizontal trace; in the green channel along any vertical line of the raster, there is a similar, symmetrical minimum-maximum-minimum variation. The red and blue lenses 26 and 30 similarly receive symmetrically varying illumination along the horizontal traces of the light spot. However, along a vertical line of the raster, the illumination of these lenses 26 and 30 respectively decreases and increases as the light spot assumes lower positions on the faceplate 14 (considered from the relative positions shown in the drawing).

In a similar way, the horizontal cosine-fourth variations of illumination of the separations 20, 22, 24 from the lens apertures are symmetrical about a central vertical line; the vertical illumination variation of the green separation 22 is likewise symmetrical about a central horizontal illumination; and the vertical illumination variations of the red and blue separations 20 and 24 are in opposite directions. The described cosine-fourth effects of the lens aperture illumination and the associated separation illumination are generally additive. Consequently, the cumulative cosine-fourth variations in illumination of the three separations 20, 22, 24 are different. These differences in illumination variation may introduce substantial errors in the relative values of the signals from the phototubes 52, 54, 56. For example, the upper edges (as viewed in the drawing) of the separations 20, 22, 24 correspond picture-wise to the same portion of the original subject, and these upper edges are scanned at the same time. The variations in light levels received by the phototubes 52, 54, 56 due to the cosine-fourth effects are not uniform, but, instead, are different in amount and different in direction along any vertical line of the three separations. These differential effects, it has been found, are generally substantial enough to introduce color shifts in the color information supplied to the computer. Such errors, if uncorrected, would generally make a printed reproduction unacceptable.

Another cause of variations in light intensity is the non-uniformities in the optical components. For example, the variable thicknesses of the condenser lenses 46, 48, 50 causes the light to travel through more glass when it passes along the optical axes of the lenses than when it passes through one of the edges of the lenses. Thus, when the light spot is at the center of the raster there is more absorption of the light due to this longer path in glass. This condenser-lens non-uniformity is substantial and exists in the same way in all of the channels; however, it is not generally consistent with the cosine-fourth variations. For example, the top portion of the red separation 20 is adjacent to the portion of the condenser lens 46 having a smaller amount of glass. As the imaged light spot moves toward this top portion of the separation 20, the decrease in illumination received by the phototube 52 due to the condenser lens 46 varies toward a minimum at the same time that the cosine-fourth variation is toward a maximum. Thus, at the top of the red separation 20, the condenser-lens and cosine-fourth effects tend to cancel; but at the bottom of this separation 20, the effects are additive. The corresponding condenser-lens and cosine-fourth variations in the light received by the blue channel phototube 56 tend to cancel and add in the opposite way to those received by the red channel phototube 52. This condenser-lens variation in the green channel is in a direction generally that tends to cancel the cosine-fourth variation in that channel. Thus, these non-uniformities are not uniform in the three channels.

A third cause of the non-uniformity of illumination is the placement of the mirror 72 off the central axis of illumination and the tilting of that mirror to reflect the light spot to the phototube 74. As a result of both of these effects, which are generally additive, the illumination level at the phototube 74 has a substantial cosine-fourth effect. In addition, there are non-uniformities in the reflecting characteristic of the mirror 72 and non-uniformities in the phototube 74 that are functions of raster position of the light spot. The sum of these effects results in substantial variations in light intensity at the phototube 74 as the raster position of the light spot changes. Due to the feedback loop through the difference amplifier 76 to the kinescope cathode, the light level of the scanning light spot is adjusted to provide a measured light level at the phototube 74 equal to that called for by the signal from the source 78. Thus, the cosine-fourth effect and the other light non-uniformities affecting the light level at the phototube 74 are introduced into the light level of the scanning spot at the phosphor screen 12. It is possible to tilt the mirror 72 and otherwise adjust its position to reduce the non-uniformity in any one channel. However, such adjustments generally increase the ranges of non-uniformity in the other two channels.

The films 64, 66, 68 are records in the form of photographic negatives of the non-uniformities in their respective channels, which non-uniformities are generally different. The transmission of each of the photographic films 64, 66, 68 is, at any point, proportional to the inverse of the transmission losses along the corresponding optical path through the associated optical channel. Thus, the transmission of each photographic film 64, 66, 68 is a minimum where the corresponding transmission losses through the associated optical channel are a maximum, and it is a maximum where the losses through the channel are a minimum. The transmission of any point of each plate 64, 66, 68 is inversely proportional to the corresponding transmission of the associated optical channel. Expressed in terms of density, there is a minimum density value in each photographic film 64, 66, 68 where there is a maximum equivalent density through the associated optical channel; and a maximum density exists in each photographic film where there is a minimum equivalent density in the associated optical channel. The density of each photographic film 64, 66, 68 is added to the equivalent density of the corresponding optical path to produce an effective density that is uniform over the entire imaged raster.

As indicated above, a minimum density of 0.50 in the exposure of the film 64, 66, 68 is chosen to insure exposure of the linear portion of the photographic characteristic. However, this minimum density of 0.50 generally results in a loss of more than 60 percent of the available light. If the light intensity of the scanning spot is reduced during exposure of the films 64, 66, 68 to reduce the minimum density of these films, such exposure extends to the toe of the photographic characteristic, and the recorded transmissions are non-linear. Of course, such non-linear exposure would generally not compensate for the non-uniformities in the optical system.

It has been found possible to reduce the densities of the photographic films 64, 66, 68 and maintain a linear relationship of the recorded non-uniformities. One method for reducing the density is as follows: First, by means of densitometer readings, one establishes the high and low density values of the photographic films made in the manner described above. Second, these high and low density values are converted to corresponding transmission values. The difference between the high and low transmission values for each such film is a measure of the amount of non-uniformity existing in the associated optical channel. Third, these photographic films are processed in a Farmer's reducer solution until the low density reading is about 0.20. The corresponding high density value for each reduced plate may be computed from the transmission difference calculated in the above second step. If the reduction of the films is proper the measured high density values of the reduced films will be consistent with the computed density values. This method results in the photographic films 64, 66, 68 having transmission values that are inversely proportional to the transmission non-uniformities of the respective optical channels, and which values are linearly related to each other. The reduced films at a substantially lower density of 0.20 lose only about 30 percent of the variable light.

A second method for making a set of practical photographic films 64, 66, 68 having low density values is as follows: First, the photographic films are exposed to a minimum density of 0.50 in a manner described above. These films are developed in Eastman Kodak magenta dye coupler developer to a gamma of one. Second, the resulting dye-developed films are bleached to remove silver grains. Third, the films are cleared in rapid liquid fixative. Fourth, the density of the dye is reduced by means of sodium hydrosulfite. Photographic films made by the dye method exhibit less diffusion, and can be reduced linearly to a lower density (for example, to a minimum density of 0.10) than photographic silver image masks.

In making the photographic films 64, 66, 68, the photographic chemistry and processing are generally the same, and the exposure is along the linear portion of the photographic characteristic. Each of these films 64, 66, 68 when positioned in the mountings 58, 60, 62, as described, compensate individually for the non-uniformities of the associated optical channel. However, it is generally quite difficult to so control the photographic chemistry and processing that the density reference levels (or the transmission constants of proportionality) are the same for all three photographic films 64, 66, 68. Consequently, it has been observed, if the separations 20, 22, 24 are replaced by test transparencies that have the same uniform transmission values the output signals of each phototube 52, 54, 56 individually are substantially uniform over the scanning raster; however, these signals differ from phototube to phototube.

It is not necessary to control the photographic chemistry and processing to provide identical density reference levels in the three films 64, 66, 68. The equivalent of such identical reference levels may be provided by adjusting the aperture stops of the imaging lenses 26, 28, 30. Such aperture stop adjustments provide individual light level adjustments for the three optical channels, and may be made within a suitable range without adverse effect on the resolution of the system. Individual adjustments of the gains of the amplifiers 65, 67, 69 may be made to compensate for any differences in these constants of proportionality of the photographic films. With either the aperture stop adjustments or the amplifier gain adjustments (or, under appropriate circumstance, with a combination of both adjustments) the outputs of the amplifiers may be made to be the same when separation areas having the same transmission value are scanned.

For the initial exposure of the compensating films 64, 66, 68, they are positioned in back of the condenser lenses 46, 48, 50 as shown in the drawing. As a consequence, all of the optical non-uniformities that are a function of raster geometry and that can be accurately recorded are on these exposed films. Geometrical non-linearities that may exist in the phototubes 52, 54, 56 are not included in the compensating films 64, 66, 68. Such phototube non-linearities could also be recorded in the compensating films by using the camera system to record the phototube outputs. However, such phototube non-linearities are generally relatively small and of the same order of magnitude as geometrical non-linearities that may exist in the camera system. Therefore, the direct exposure of the films 64, 66, 68 by positioning them in the mountings 58, 60, 62 tends to provide the optimum results and has been used.

At the positions of the films 64, 66, 68 behind the condenser lenses 46, 48, 50, the raster image is somewhat out of focus. As a result, a continuous tone record of the geometrical non-linearities of each optical channel is provided. Such continuous tone record is preferred to a sharply focused image of the raster lines, because strong discontinuities of sharply focused lines would tend to appear as such in the scanning operations as though they were part of the picture in the separations 20, 22, 24. Some focusing of the raster image is required for exposing these plates 64, 66, 68 to the extent necessary to record the variations in the geometrical non-uniformities.

The films 64, 66, 68 may be positioned in other places in their associated channels than their exposure positions. However, any such change of position may require a change of magnification of the recorded image to conform to the relative raster image dimensions at the changed position. In general, a position of the exposed films 64, 66, 68 in front of the separations 20, 22, 24 is not desirable because of deteriorating effects on the resolution of the scanning spot.

Light non-uniformities exist in the image reproducing system, the camera, for reasons similar to those described above. A photographic record containing the inverse of these non-uniformities may be made in a manner similar to that described for a scanning system. In the camera, a photographic film positioned in the mounting 104 in place of the color corrected separation 106 records an image of the raster of the tube 92. For this exposure, the selector switch 116 is connected by way of the terminal 120 to the constant-signal source 78. Such a compensating film is developed and may be replaced in the camera in a manner similar to the compensating films 64, 66, 68 for the scanning system. Only a single compensating film is needed for the single optical channel in the camera.

In general, the light requirements for proper exposure of the color corrected film 106 are such that the light losses due to a compensating film may be more than can be conveniently tolerated. Under such circumstances, the color corrected negatives 106 may be exposed in the camera without a compensating film in the system. The geometrical non-uniformities that are recorded in the negatives 106 may be eliminated in a subsequent photographic process. For example, in making a positive out of the negative 106, a compensating film may be bound in registry with each corrected negative. The geometrical non-uniformities are cancelled in the exposure of such a positive. This cancelling arrangement has an advantage of using a stationary light source of essentially unlimited intensity. The high density of a compensating film is generally not an impediment to photographic processing using a stationary light source.

This system of using a compensating film outside of the optical system to be compensated may also be used for the scanning system. The compensating films 64, 66, 68 may be used in making the separations 20, 22, 24 instead of in the optical channels. For example, if separation positives are employed for the scanning, the films 64, 66, 68 may be positioned in the optical system used for printing such positives from separation negatives. The size of these films 64, 66, 68 may be reduced or enlarged, as required, or the position of the compensating films in the printer optical system may be adjusted appropriately to provide the proper magnification. The separations so made contain the inverse of the geometrical non-linearities of their respective optical channels. Thus, such separations cancel the non-uniformities of the optical channels in the same way as the compensating sheets 64, 66, 68.

In accordance with this invention a cathode ray tube optical system is provided in which light non-uniformities in the system that are a function of the tube raster geometry are compensated. Means are provided for recording these non-uniformities and cancelling them. A cathode ray tube system having a plurality of optical channels may be so compensated with any compensating factors or constants being properly related.

What is claimed is:

1. In combination; means for producing a moving light spot over a raster, said means including a cathode ray tube; an optical channel including lens means for imaging the light from said spot; and means in the optical path of said channel for compensating for light non-uniformities in said channel that are a function of the geometrical position of said light spot in said raster, said compensating means including a transparency that incorporates non-uniformities that are the inverse of said channel non-uniformities, said compensating means being positioned to receive the light of said spot after being imaged by said lens means.

2. In a scanning system, the combination of: means for producing a scanning light spot over a raster, said means including a cathode ray tube; an optical channel including lens means for imaging said light spot on a subject to be scanned; and means mounted in the optical path of said channel for compensating light non-uniformities in said channel that are a function of the geometrical position of said light spot in said raster, said compensating means including a photographic transparency that incorporates non-uniformities that are the inverse of said channel non-uniformities, said photographic transparency being positioned to receive the light of said spot after being imaged by said lens means.

3. In a scanning system, the combination of: means for producing a scanning light spot over a raster, said means including a cathode ray tube; a plurality of optical channels each including separate lens means for imaging said light spot on separate subjects to be scanned; and separate means mounted in the optical paths of said channels for individually compensating light non-uniformities in the associated ones of said channels, which non-uniformities are a function of the geometrical position of said light spot in said raster, each of said compensating means including a different photographic transparency that incorporates non-uniformities that are the inverse of said non-uniformities of the associated channel, said photographic transparencies being positioned to receive the light of said spot after being imaged by the associated lens means.

4. In a scanning system, the combination of: means for producing a scanning light spot over a raster; a plurality of optical channels each including separate lens means for imaging said light spot on separate transparent subjects to be scanned; separate photoelectric means for said channels arranged to receive light transmitted by the associated subjects and to produce electrical signals in accordance with the transmission characteristics of said subjects; and separate means mounted in the optical paths of said channels for individually compensating light non-uniformities in the associated ones of said channels, which non-uniformities are a function of the geometrical position of said light spot in said raster, each of said compensating means including a different photographic transparency that incorporates non-uniformities that are the inverse of said non-uniformities of the associated channel, said photographic transparency being positioned to receive the light of said spot after being imaged by said lens means; one of said means including adjustable means for eliminating differences in said electrical signals due to differences in density reference levels of said photographic transparencies.

5. In a scanning system, the combination as recited in claim 4, wherein said separate lens means each includes a different adjustable aperture stop for individually controlling the light level for the associated channel, said adjustable means including said aperture stops.

6. In a scanning system, the combination as recited in claim 4 wherein said photoelectric means each includes a different amplifier means having a gain adjustment means, said adjustable means including said amplifier gain adjustment means.

7. In a scanning system, the combination of: means for producing a scanning light spot over a raster, said means including a cathode ray tube; photoelectric means for deriving electrical signals in accordance with light received; an optical channel including means for supporting a transparent subject to be scanned, lens means for imaging said light spot on said subject, and condenser lens means for directing light passing through said subject to said photoelectric means; and means mounted in the optical path of said channel for compensating light non-uniformities in said channel that are a function of the geometrical position of said light spot in said raster, said compensating means including a photographic transparency that incorporates non-uniformities that are the inverse of said channel non-uniformities, said photographic transparency being positioned to receive the light of said spot after being imaged by said imaging lens means.

8. In a scanning system, the combination of: means for producing a scanning light spot over a raster, said means including a cathode ray tube; an optical channel including lens means for imaging said light spot on a subject to be scanned; and means mounted in the optical path of said channel for compensating light non-uniformities in said channel that are a function of the geometrical position of said light spot in said raster, said compensating means including a photographic transparency made by exposure to the imaged light spot in a channel position in which the image of said raster is somewhat out of focus to provide a continuous record of non-uniformities that are the inverse of said channel non-uniformities, said photographic transparency being positioned to receive the light of said spot after being imaged by said lens means.

9. In a scanning system; the combination of means for producing a scanning light spot over a raster, said means including a cathode ray tube; photoelectric means for deriving electrical signals in accordance with light received; an optical channel including means for supporting a transparent subject to be scanned, lens means for imaging said light spot on said subject, and additional lens means for directing light passing through said subject to said photoelectric means; and means mounted in the optical path of said channel for compensating light non-uniformities in said channel that are a function of the geometrical position of said light spot in said raster, said compensating means including a photographic transparency made by exposure to the imaged light spot in a channel position between said additional lens means and said photoelectric means to incorporate non-uniformities that are the inverse of said channel non-uniformities, said photographic transparency being positioned in said channel position to receive the light of said spot after passing through said transparent subject and said condenser lens means.

10. In a scanning system, the combination as recited in claim 9 wherein said compensating photographic transparency is made by being developed, after said exposure, to a gamma of one, and then processed in a density reducing solution.

11. In a scanning system, the combination as recited in claim 9 wherein said compensating photographic transparency is made by being developed, after said exposure to a gamma of one in a dye coupler developer, by being bleached, and then processed in a density reducing solution.

12. In a color correction system, the combination comprising means for producing a light spot moving over a raster to scan a subject having color characteristics; a plurality of optical channel means, each of said channel means being associated with a different component color of said subject and arranged for deriving values of light from said light spot in accordance with the associated component color characteristic of said subject; a plurality of photoelectric means for deriving electrical signals in accordance with the light values received, each of said photoelectric means being associated with a different one of said optical channel means and arranged to receive the light values thereof; separate means mounted in the optical paths of said channel means for individually compensating light non-uniformities in the associated ones of said channel means, which light non-uniformities are a function of the geometrical position of said light spot in said raster, each of said compensating means including a different photographic transparency that incorporates non-uniformities that are the inverse of said non-uniformities of the associated channel means; and means arranged to receive said electrical signals from said photoelectric means for deriving color corrected signals; at least one of said means including adjustable means for compensating differences in density reference levels of said photographic transparencies.

13. In a color correction system, the combination as recited in claim 12 wherein said optical channel means each includes a different imaging lens having an adjustable aperture stop for individually controlling the scanning light level for the associated channel means, said adjustable means including said aperture stops.

14. In a color correction system, the combination as recited in claim 12 wherein said photoelectric means each includes a different amplifier means having a gain adjustment means, said adjustable means including said amplifier gain adjustment means.

15. In a color correction system, the combination comprising means for producing a light spot moving over a raster to scan a subject having color characteristics; a plurality of optical channel means, each of said channel means being associated with a different component color of said subject and arranged for deriving values of light from said light spot in accordance with the associated component color characteristic of said subject; a plurality of photoelectric means for deriving electrical signals in accordance with the light values reecived, each of said photoelectric means being associated with a different one of said optical channel means and arranged to receive the light values thereof; separate means mounted in the optical paths of said channel means for individually compensating light non-uniformities in the associated ones of said channels means, which light non-uniformities are a function of the geometrical position of said light spot in said raster, each of said compensating means including a different photographic transparency that incorporates non-uniformities that are the inverse of said non-uniformities of the associated channel means, and means arranged to receive said electrical signals from said photoelectric means for deriving color corrected signals; at least one of said means including adjustable means for compensating differences in density reference levels of said photographic transparencies, means for exposing color corrected separations in accordance with said color corrected signals.

16. In a scanning system, the combination of: means for producing a scanning light spot to move over a raster; photoelectric means for deriving electrical signals in accordance with light received; an optical channel including means for supporting a transparent subject to be scanned, lens means for imaging said light spot on said subject and for directing light through said subject to said photoelectric means; and means mounted in the optical path of said channel for compensating light non-uniformities in said channel that are a function of the geometrical position of said light spot in said raster, said compensating means including a transparency that incorporates non-uniformities that are the inverse of said channel non-uniformities.

References Cited in the file of this patent

UNITED STATES PATENTS

| | | |
|---|---|---|
| 2,434,561 | Hardy | Jan. 13, 1948 |
| 2,710,889 | Tobias | June 14, 1955 |
| 2,721,892 | Yule | Oct. 25, 1955 |
| 2,727,940 | Moe | Dec. 20, 1955 |
| 2,740,828 | Haynes | Apr. 3, 1956 |
| 2,757,571 | Loughren | Aug. 7, 1956 |

UNITED STATES PATENT OFFICE
CERTIFICATE OF CORRECTION

Patent No. 2,885,463 May 5, 1959

John S. Rydz

It is hereby certified that error appears in the printed specification of the above numbered patent requiring correction and that the said Letters Patent should read as corrected below.

Column 1, lines 34 and 35, for "separations, a set of" read -- separations. From the corrected color separations, a set of --; column 12, line 15, for "reecived" read -- received --.

Signed and sealed this 8th day of September 1959.

(SEAL)
Attest:

KARL H. AXLINE
Attesting Officer

ROBERT C. WATSON
Commissioner of Patents